US012723487B2

(12) United States Patent
Goodman et al.

(10) Patent No.: US 12,723,487 B2
(45) Date of Patent: Sep. 1, 2026

(54) AXIALLY AND ROTATIONALLY LOCKED MODULAR VALVE ASSEMBLY SYSTEM

(71) Applicant: Weatherford Technology Holdings, LLC, Houston, TX (US)

(72) Inventors: Brandon Goodman, Houston, TX (US); Joshua Symms, Houston, TX (US); Brandon Bourg, Houston, TX (US); Abraham Alvarez, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 18/427,794

(22) Filed: Jan. 30, 2024

(65) Prior Publication Data

US 2025/0243730 A1 Jul. 31, 2025

Related U.S. Application Data

(60) Provisional application No. 63/625,136, filed on Jan. 25, 2024.

(51) Int. Cl.
*E21B 34/10* (2006.01)
*F16K 15/06* (2006.01)

(52) U.S. Cl.
CPC ............ *E21B 34/10* (2013.01); *F16K 15/063* (2013.01)

(58) Field of Classification Search
CPC ....... E21B 21/10; E21B 34/10; E21B 2200/04
See application file for complete search history.

(56) References Cited

U.S. PATENT DOCUMENTS

| | | | | |
|---|---|---|---|---|
| 3,332,499 | A | 7/1967 | Harris | |
| 4,712,619 | A | 12/1987 | Stepp | |
| 4,872,510 | A | 10/1989 | Lehr | |
| 4,934,452 | A | 6/1990 | Bradley | |
| 5,411,049 | A | 5/1995 | Colvard | |
| 5,909,771 | A | 6/1999 | Giroux | |
| 6,622,795 | B2 | 9/2003 | Hebert et al. | |
| 6,719,003 | B2 | 4/2004 | Schroeder et al. | |
| 6,820,695 | B2 | 11/2004 | Stevens et al. | |
| 7,527,104 | B2 | 5/2009 | Branch et al. | |
| 7,617,879 | B2 | 11/2009 | Anderson et al. | |
| 8,757,268 | B2 * | 6/2014 | LeJeune | E21B 21/10 166/325 |
| 9,429,956 | B1 * | 8/2016 | Levy | F16K 15/00 |
| 10,088,064 | B2 * | 10/2018 | Churchill | E21B 21/10 |
| 10,100,578 | B2 | 10/2018 | Lyon | |
| 10,174,852 | B2 | 1/2019 | Arian et al. | |
| 10,378,296 | B2 | 8/2019 | Downey et al. | |
| 10,590,734 | B2 | 3/2020 | Gosselin | |
| 11,255,131 | B2 | 2/2022 | Stair et al. | |
| 11,421,509 | B2 * | 8/2022 | Cress | F16K 17/04 |
| 11,781,397 | B2 | 10/2023 | Lowry et al. | |
| 2011/0192608 | A1 * | 8/2011 | LeJeune | F16K 15/063 166/319 |
| 2014/0332277 | A1 * | 11/2014 | Churchill | F16K 15/00 175/57 |

(Continued)

*Primary Examiner* — Jennifer H Gay
(74) *Attorney, Agent, or Firm* — Peter V. Schroeder; Booth Albanesi Schroeder PLLC

(57) ABSTRACT

A modular system of plunger valve assemblies provides for axially and rotationally locking joints between upper and lower valve housings. Also provided are rotationally locking joints between adjacent valve assemblies.

19 Claims, 7 Drawing Sheets

(56) References Cited

U.S. PATENT DOCUMENTS

| | | | | |
|---|---|---|---|---|
| 2020/0240236 | A1 * | 7/2020 | Cress | E21B 34/06 |
| 2023/0399899 | A1 * | 12/2023 | Mackay | E21B 17/16 |
| 2024/0183247 | A1 * | 6/2024 | Santos | F16K 31/20 |

* cited by examiner 42b
64b
84
72b
74b
40b
86b
12b
42b
82
42a
80
72a
64a
40a
88b
12a
74a
86a
88a

AXIALLY AND ROTATIONALLY LOCKED MODULAR VALVE ASSEMBLY SYSTEM

CROSS-REFERENCE TO RELATED APPLICATIONS

This is a U.S. Non-Provisional application claiming priority to the prior-filed U.S. Provisional Application No. 63/625,136, filed Jan. 25, 2024.

TECHNICAL FIELD

This disclosure relates generally to valve assemblies for use in subterranean wells, and more particularly, to modular valve assemblies for use in downhole operations.

BRIEF DESCRIPTION OF THE DRAWINGS

Drawings of the preferred embodiments of the present disclosure are attached hereto so that the embodiments of the present disclosure may be better and more fully understood.

DETAILED DESCRIPTION OF EMBODIMENTS OF THE DISCLOSURE

After a wellbore is drilled through a formation, it is typical to line the wellbore with a tubular, such as a casing. To prevent the casing from moving within the wellbore, the casing annulus is filled with cement during a cementing operation. As the casing is run into the wellbore it is typically filled with a fluid, such as drilling mud. It is common to place a float shoe or float collar at or near the bottom of the casing string. A float assembly typically has one or more unidirectional valve assemblies which allow fluid to pass from the casing string into the annulus but prevent flow from the annulus back into the casing string.

While running the casing string into the wellbore, it is common to use the wellbore fluid to sustain a portion of the weight of the casing string by floating the casing string in the wellbore fluid. The valve assemblies prevent fluid flow from the bottom of the string, allowing the string to float in the fluid present in the wellbore. Once in position in the wellbore, the valve assemblies allow the flow of fluids during, for example, a cementing operation, such as spacer fluid, cement fluid, displacement fluid and the like, as they are pumped down the casing string, through the unidirectional valves and into the wellbore annulus. The valves keep these fluids from flowing from the annulus back into the casing string. The valve assemblies can be positioned in the float shoe and float collar itself, or in a tubular for that purpose above the float shoe and collar in the workstring. It is common for the valve assemblies to be single-use assemblies which are drilled or milled out of the wellbore after use. In some cases, the valve assemblies are used to act as barriers in the wellbore.

The terms "above" and "below, and "behind" and "in front," are used herein without respect to whether the wellbore is vertical or horizontal. Similarly, the terms "uphole," "downhole," and the like are used without respect to whether the wellbore is vertical or horizontal. For example, a fluid, tool or the like, said to be above, behind, or uphole of another tool is relatively closer to the wellhead, or having entered the wellbore later, whether along a horizontal or vertical portion of the wellbore. Similarly, terms such "upstream" and "downstream" are used in reference to direction of fluid flow and without regard to the orientation of the wellbore. As persons of skill in the art will understand, the disclosures herein are applicable in horizontal, vertical, deviated and other wells.

Figure 1:
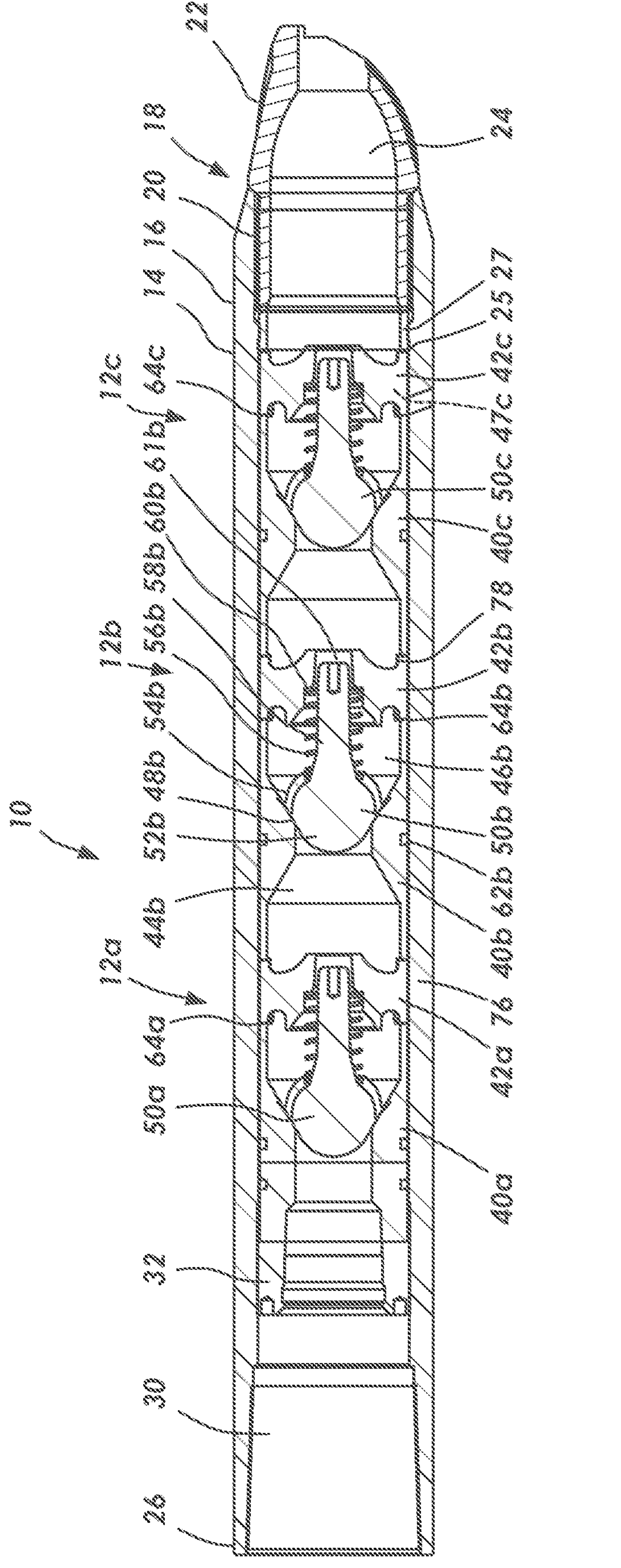
FIG. 1 is a cross-sectional schematic of multiple exemplary valve assemblies configured in a workstring tubular according to aspects of the disclosure.
Figure 2:
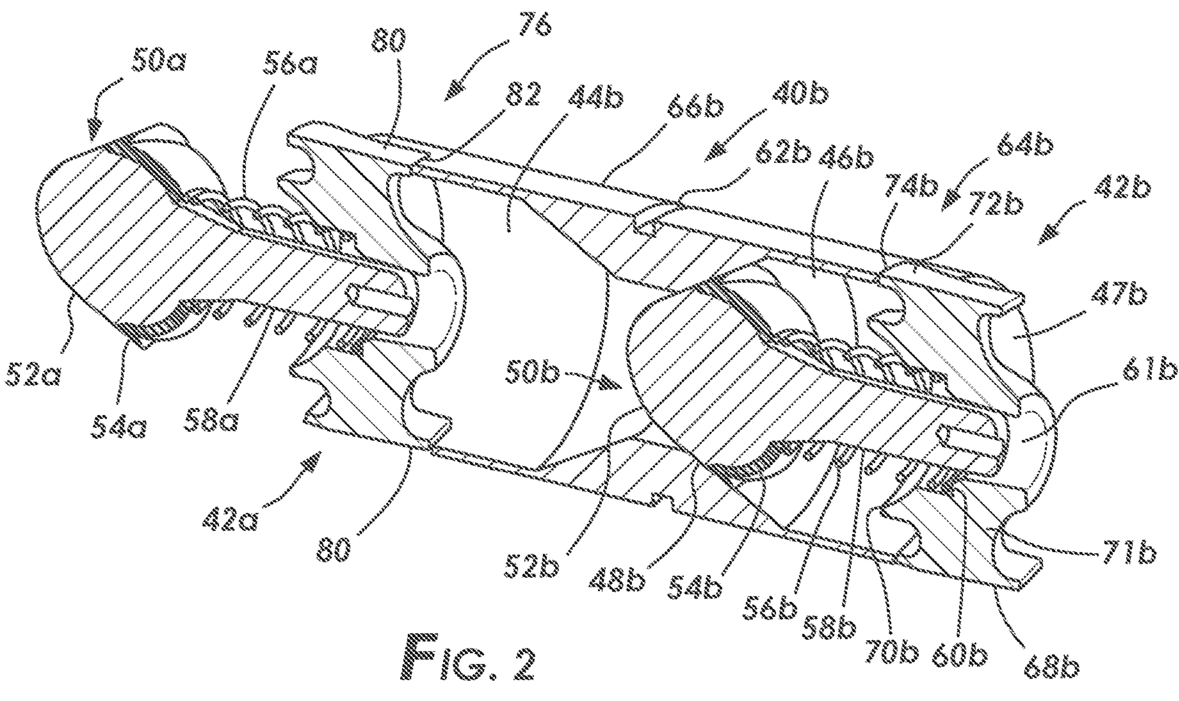
FIG. 2 is cross-sectional, orthogonal, detail view of an exemplary valve assembly and valve components with parts of an adjacent valve assembly taken from FIG. 1, having plungers in closed positions, according to aspects of the disclosure.
Figure 3:
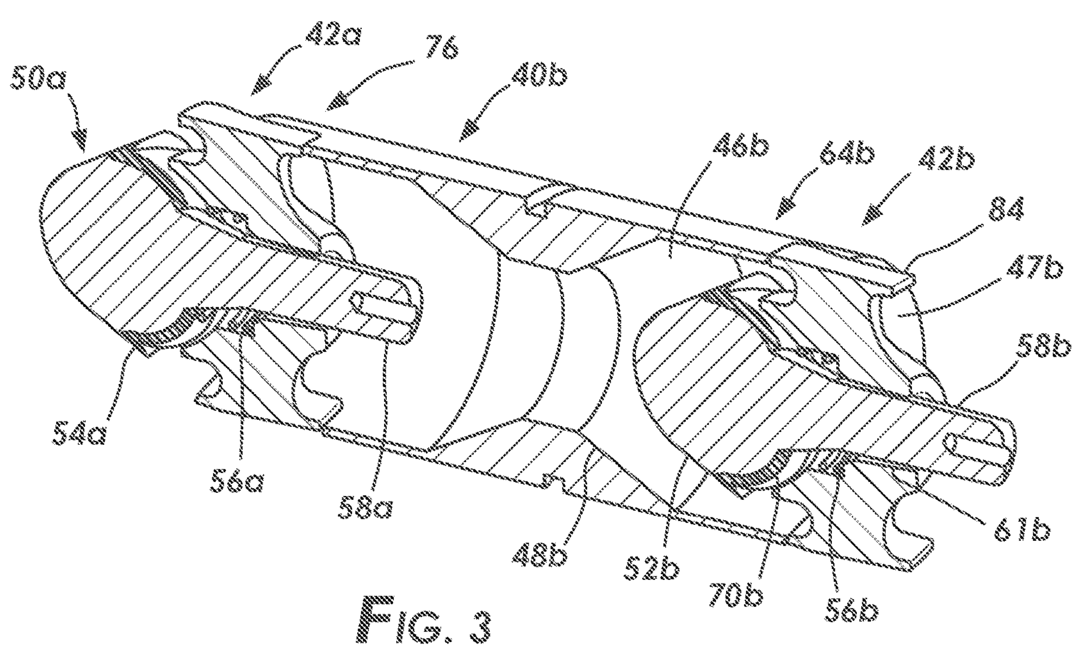
FIG. 3 is the assembly according to FIG. 2 with the plungers in open positions.
Figure 4:
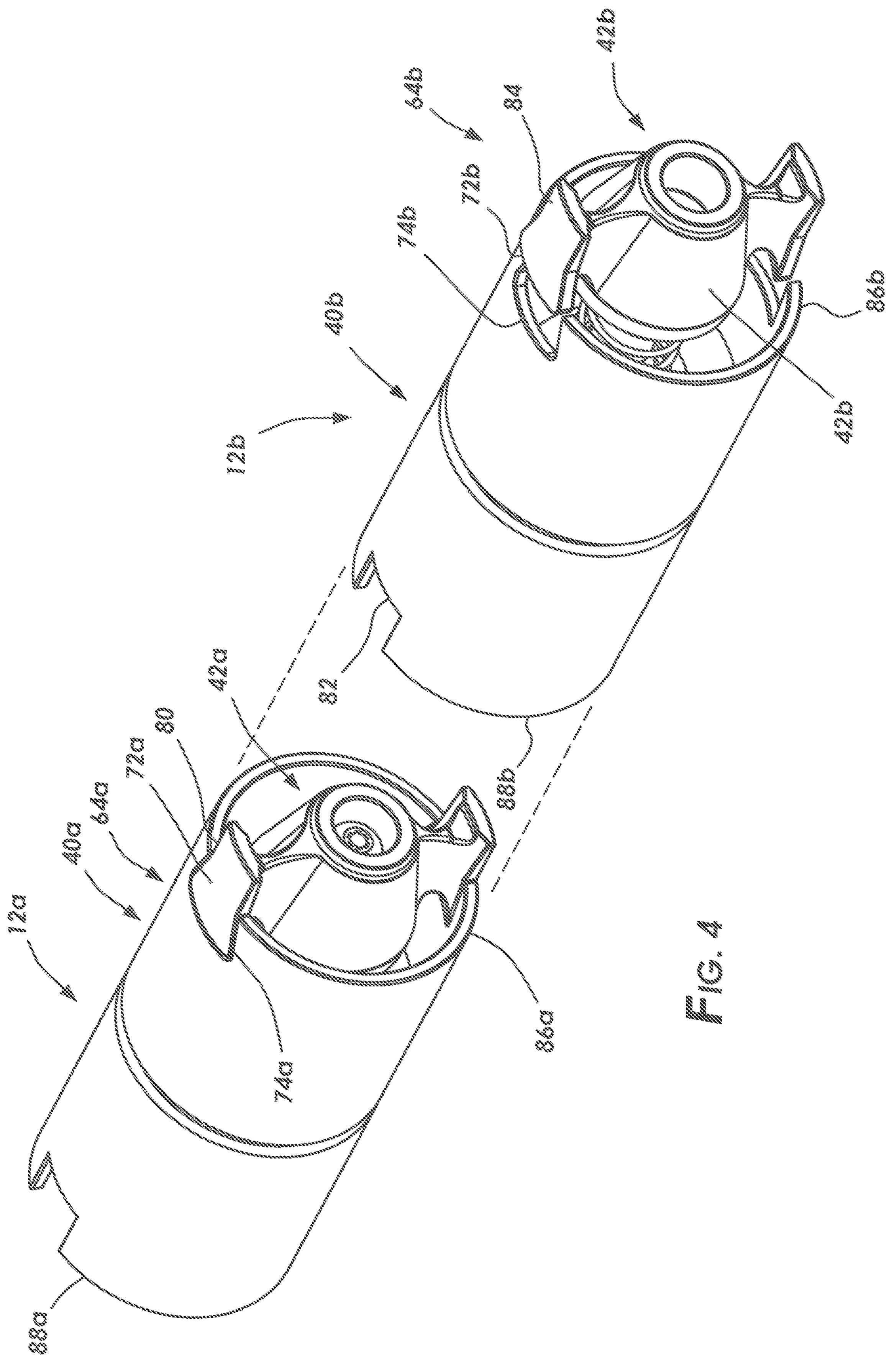
FIG. 4 is an orthogonal, partially exploded view of an assembled valve assembly and a partially assembled valve assembly according to aspects of the disclosure.
Figure 5:
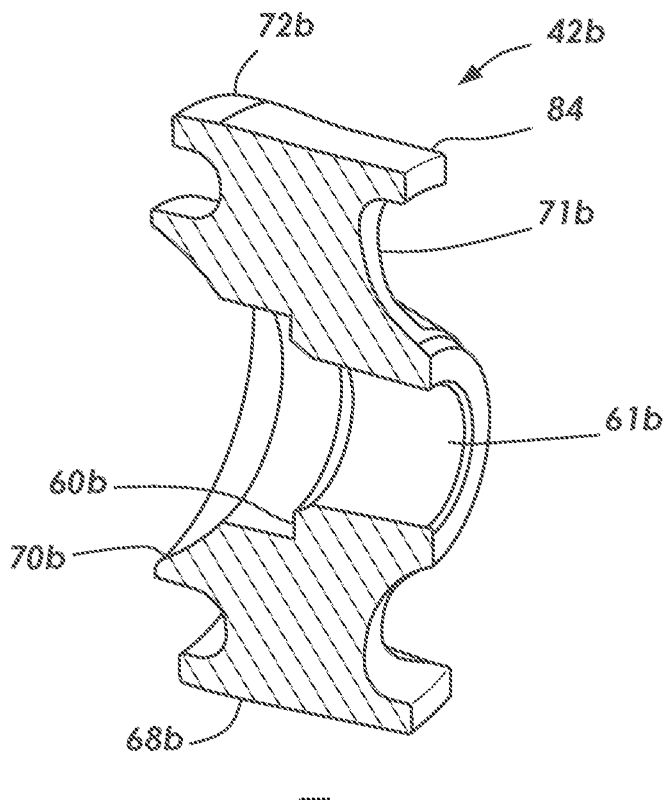
FIG. 5 is a cross-sectional view of an exemplary lower housing of a valve assembly according to aspects of the disclosure.
Figure 6:
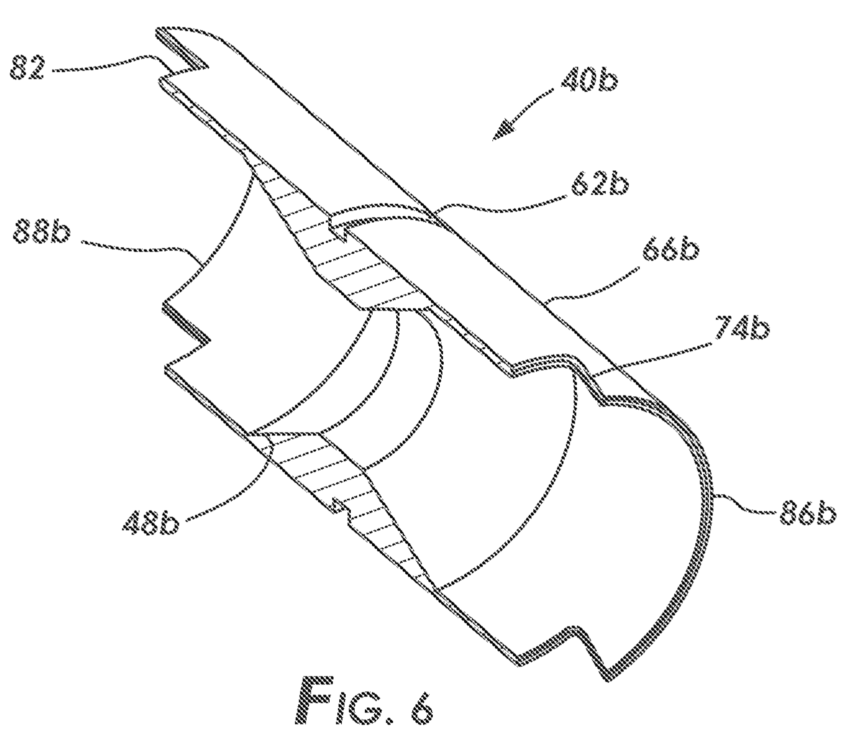
FIG. 6 is cross-sectional view of an exemplary upper housing of a valve assembly according to aspects of the disclosure.
Figures 7, 8:
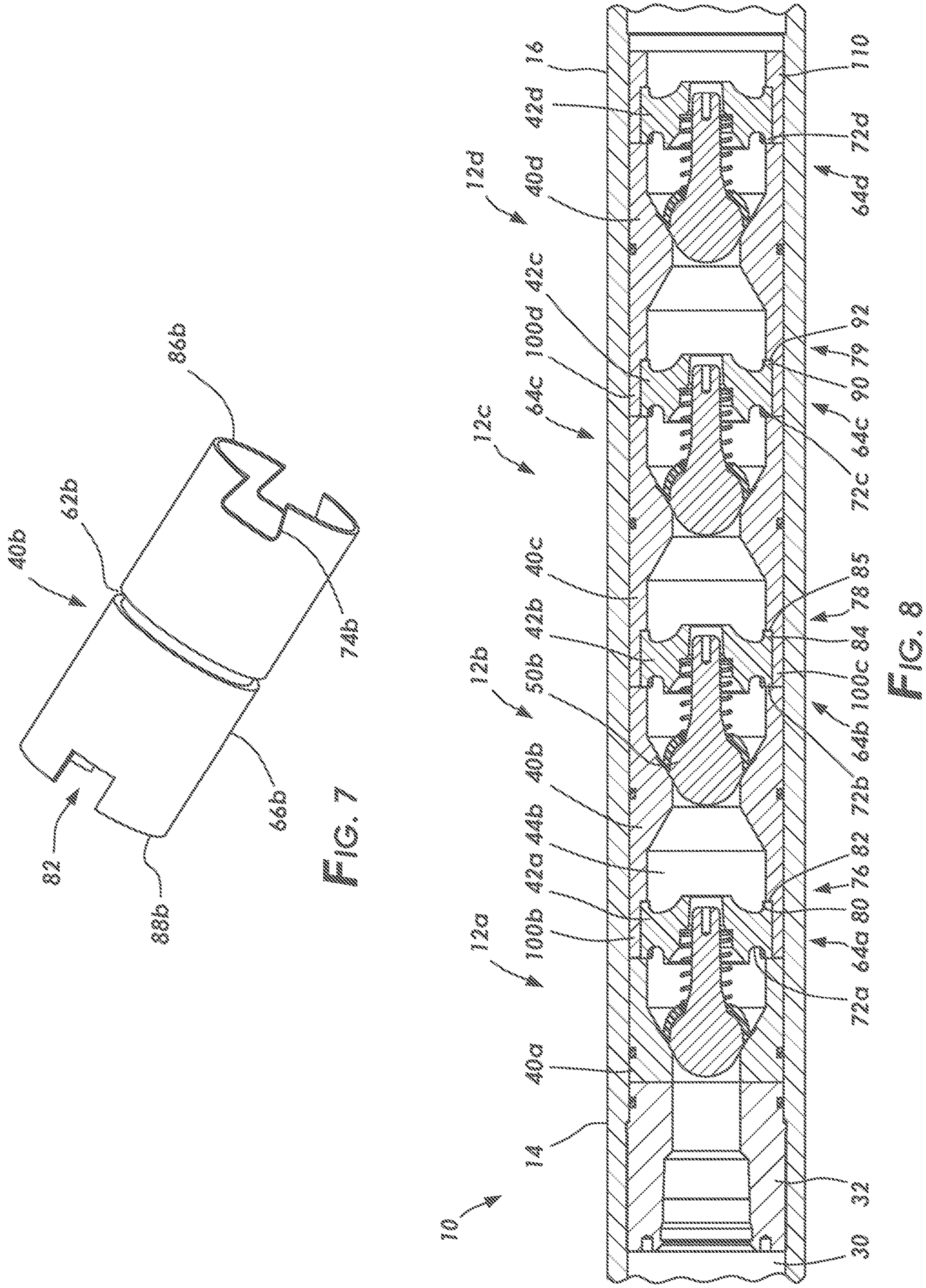
FIG. 7 is an orthogonal view of an exemplary upper housing of a valve assembly according to aspects of the disclosure.
FIG. 8 is a cross-sectional schematic of multiple exemplary valve assemblies configured in a workstring tubular according to aspects of the disclosure.

FIGS. 1-7 are views of exemplary valve assemblies and parts thereof for explaining certain embodiments of the disclosure and are discussed together, with like parts bearing like numbers. FIG. 1 is a cross-sectional schematic of multiple exemplary valve assemblies configured in a workstring tubular according to aspects of the disclosure. FIG. 2 is cross-sectional orthogonal view of an exemplary valve assembly and additional valve components, having two plungers seen in closed positions, according to aspects of the disclosure. FIG. 3 is cross-sectional orthogonal view, as in FIG. 2, but with the plungers in open positions. FIG. 4 is an orthogonal, partially exploded view of an assembly showing an assembled valve and a partially assembled valve. FIG. 5 is a cross-sectional view of an exemplary lower housing of a valve assembly. FIG. 6 is cross-sectional view of an exemplary upper housing of a valve assembly. FIG. 7 is an orthogonal view of an exemplary upper housing of a valve assembly according to aspects of the disclosure.

A modular system of valve assemblies 10 is seen in cross-section in FIG. 1, in this case, having three valve assemblies 12*a-c*. The valve assemblies 12*a-c* are for use in a workstring or the like, such as in a cementing workstring. Practitioners will understand the types of workstring and purposes for which the valve system can be used. In FIG. 1, the valve assemblies 12*a-c* are positioned in the bore 30 of a wellbore tubular 14. The tubular 14 has a lower end 16 to which is attached to further tubulars, tools, or, in this case, a float shoe 18 at a connection 20, such as a threaded connection. The float shoe body 22 defines a throughbore 24 for fluid flow through the shoe. The float shoe, tubular, or an insert 110 in the tubular provides a shoulder 25 or other stop for abutting the lower valve assembly 12*c*, to maintain the lower valve assembly in position in the tubular. The tubular 14 has an upper end 26 which can be attached to a workstring. The tubular 14 may also house additional components, such as a threaded nut 32 for maintaining the assemblies in the tubular. Although the exemplary FIG. 1 shows three modular valve assemblies, it is understood that a different number of assemblies can be used.

The exemplary valve assemblies 12*a-c* are discussed with like parts appearing in the valve assemblies, unless stated otherwise, and are indicated using like part numbers but with an identifying letter suffix. In some cases, valve assembly parts may be referred to using the reference number without suffix. In such cases, it is to be assumed that each or any of the valve assemblies may have such a part.

Valve assembly 12*b* has an upper housing 40*b* and a lower housing 42*b* attached to one another at an interlocking joint 64*b*. The attached upper housing 40*b* and lower housing 42*b* define a longitudinal throughbore 44*b*. The throughbore 44*b*, along some lengths, can be annular, or employ multiple passageways. The throughbore is annular about the plunger at bore section 46*b* and split into multiple passageways by the lower housing 42*b* at bore section 47*b*. The split bore along bore section 47 is understood in the embodiment seen in FIGS. 1-7 as defined between the lower housing 42 and the interior wall of the tubular 14. The split bore along bore section 47 is understood in the embodiment seen in FIGS. 8-11 as defined by the lower housing 42 and the interior wall of the upper housing 40*b*.

The upper housing 40*b* has a valve seat 48*b* formed therein for engaging a plunger 50*b* at its head 52*b*. The head 52*b* of the plunger can employ a sealing member 54*b* to seal, or assist in sealing, against fluid flow past the plunger 50*b* when the plunger is in a closed position. The plunger head 52*b* is attached to a stem 58*b* which reciprocates through a stem bore 61*b* defined in the lower housing 42*b*. The plunger 50*b* is movable between a closed position and an open position. In the closed position, as seen in FIGS. 1 and 2, the plunger is in contact with the valve seat 48*b* and fluid flow through the valve assembly is prevented or hindered. More specifically, the sealing member 54*b* is seated against seat 48*b*. In the open position, as seen in FIG. 3, the plunger is spaced apart from the valve seat 48*b*, allowing fluid flow through the throughbore 44*b*, past the plunger, and through the valve assembly. The plunger 50*b* is fluid activated and moves from the closed position towards the open position in response to fluid pressure in the throughbore above the plunger. When the valve is open, fluid flow past the plunger maintains the plunger in the open position until fluid flow ceases or is reduced in rate, or pressure, such that the force of the biasing mechanism closes the valve.

The plunger 50*b* is biased into contact with the valve seat 48*b* by a biasing mechanism 56*b*, here shown as a coil spring. The biasing mechanism 56*b* is, in the embodiment shown, positioned around the valve stem 58*b* and is seated at a lower end against seat 60*b* defined by the lower housing 42*b*, and at an upper end against the plunger 50*b*. Persons of skill in the art will recognize that the biasing mechanism can seat against, or act upon, various portions of the plunger, lower housing or other stationary portion of the valve assembly. Persons of skill in the art will recognize that the biasing mechanism can alternately be other types of springs known in the art, such as torsion, leaf, conical, extension, spiral, Belleville, wave washers, or elastic material mechanisms as are known in the art.

The upper housing 40*b* can be monolithic or comprised of multiple connected parts. The upper housing 40*b* defines an exterior surface 66*b*. The upper housing is sized to fit into a tubular 16, having an outer diameter of a dimension to fit into the tubular bore. A circumferential groove 62*b* is provided in the exterior surface for a circumferential seal to prevent fluid flow between the tubular and the exterior surface 66*b* of the upper housing. The seat 48*b* for the plunger 50*b* is defined in the upper housing 40*b*. The seat 48*b* can be a conical surface, as shown, for abutting a corresponding conical surface defined on the plunger head 52*b* or sealing member 54*b*. The seat 48*b* is monolithic with the upper housing, however, the seat can be defined by a separate member, or members, inserted into the throughbore, attached to the upper housing.

The lower housing 42*b* retains the plunger 50*b* in the throughbore 44*b* as it reciprocates between open and closed positions. The lower housing 42*b* defines a stem bore 60*b* through which the stem 58*b* reciprocates. The lower housing 42*b*, in the embodiment shown, defines a seat 60*b* on which the biasing mechanism 56*b* seats. The lower housing, in the embodiment shown, defines a retaining surface 70*b* against which the plunger impinges when in the fully open position, as seen in FIG. 3. In some embodiments, the retaining surface is provided by the biasing mechanism, such as where the plunger is limited in downward movement by a compressed biasing spring.

The lower housing 42*b* extends across the throughbore 44*b*. In some embodiments, the lower housing has opposing arms 71*b* for attaching the lower housing 42*b* to the upper housing 40*b*. The lower housing 42*b* defines an outer diameter at an exterior surface 68*b*. In some embodiments, the outer diameter of the lower housing 42*b* is the same as the outer diameter of the upper housing 40*b*. Such an arrangement can be seen in FIGS. 1-7, wherein the outer surfaces of the lower and upper housings are flush. In other embodiments, such as the embodiment seen in FIGS. 8-11, the outer diameter of the lower housing is less than the outer diameter of the upper housing.

The interlocking joint 64*b* axially locks the upper and lower housings to one another. Additionally, the interlocking joint 64*b* rotationally locks the upper and lower housings to one another. Stated another way, the interlocking joint 64*b* provides a rotational locking mechanism to prevent relative rotational movement between the upper and lower housing and provides an axial locking mechanism to prevent relative axial movement of the upper and lower housings. In some cases, it is important to maintain axial spacing between valve assemblies, or to maintain axial spacing between the valve components of a valve assembly to ensure proper valve function. The axial lock is designed to maintain proper axial spacing between the upper and lower housings. It is common for the valve assemblies 12 to be single-use assemblies, destined to be drilled-out or milled-out. In such cases, the housing of each assembly are rotationally locked to one another to prevent rotation in response to the drill, thus insuring a more thorough and efficient drill-out procedure.

In the embodiments seen in the Figures, the interlocking joint provides at least one set of cooperating locking components 72 and 74 on the upper and lower housings. As best seen in FIGS. 4-7, the lower housing 42*b* defines a key 72*b* which interlocks with a cooperating keyway 74*b* defined in the upper housing 40*b*. Here, the key 72*b* is a generally trapezoidal plate which fits into a generally trapezoidal keyway 74*b*. Other shapes can be employed which will provide both rotational and axial locking, as will be apparent to those of skill in the art. In the embodiment shown, the key is defined on the lower housing and the keyway on the upper housing, although the opposite arrangement can be employed. In the embodiment shown, the interlocking joint employs two opposed keys on the lower housing and two cooperating opposed keyways on the upper housing.

When the upper and lower housings are assembled, as seen in the valve assembly 12*a* in FIG. 4, the key 72*b* is fitted into the keyway 74*b*. Axial movement of the lower housing 42*b* is prevented by the interlocking action of the key and keyway. That is, the lower housing 42*b* cannot be axially pulled apart from the upper housing 40*b* due to the interaction of the key and keyway. Further, with the key 72*b* fitted in the keyway 74*b*, the upper and lower housings cannot be rotated with respect to one another due to the interlocking nature of the joint 64*b*. The interlocked housings necessarily maintain rotational positioning between the upper and lower housings and axial positioning between the upper and lower housings, and between adjacent valve assemblies. Note that a threaded connection between the upper and lower housings permits relative rotation, at least in the loosening direction. Since the valve assemblies often undergo rotational forces during deployment, a threaded connection can result in loss of a rotational alignment as the threaded connection loosens, and, since rotation of the thread also effects axial positioning, a loss of axial positioning between housings and adjacent assemblies. Consequently, the interlocking joint as disclosed herein is a non-threaded joint and does not employ a threaded connection. Similarly, the rotationally locking junction, as disclosed herein, is a non-threaded junction and does not employ a threaded connection.

During assembly of the upper and lower housings 40*b* and 42*b*, respectively, it is necessary to first position the lower housing 42*b* such that it is not axially aligned with the upper housing 40*b*, as seen in FIG. 4 with regard to valve assembly 12*b*. Once the corresponding keys 72*b* are aligned with their respective keyways 74*b*, the lower housing 42*b* can be brought into axial alignment with the upper housing 40*b*.

In some embodiments, adjacent valve assemblies are rotationally locked to one another. As best understood through FIGS. 4-7, the valve assembly 12*a* is connected to the valve assembly 12*b* along a rotationally locking junction 76 which rotationally locks the valve assemblies 12*a* and 12*b* to one another. A similar rotationally locking junction 78 is seen in FIG. 1 locking valve assemblies 12*b* and 12*c* to one another.

The rotationally locking junction 76 comprises a first connection member 80 defined on the lower housing 42*a* of the valve assembly 12*a* and a second connection member 82 defined on the upper housing 40*b* of the valve assembly 12*b*. In the embodiment shown, the connection members 80 and 82 comprise a cooperating tab and slot. The connection member 80 is a tab while the connection member 82 is a cooperating slot, although the opposite arrangement can be employed. In the embodiment shown, the cooperating member 80 is a tab and is monolithic with the key 72*a*. Alternate arrangements, such as a tab attached to the key by fasteners or the like, will be apparent to those of skill in the art. Further, in some embodiments, the tab and key can be spaced apart, or appear at separate locations on the lower housing, for example.

In the embodiment shown, the lower edge 86*a* of the upper housing 40*a* of the valve assembly 12*a* is adjacent to the upper edge 88*b* of the upper housing 40*b* of the valve assembly 12*b* along junction 76 along a circumference, broken by the interposition of the connection members 80 and 82.

A similar rotationally locking junction 78 is formed between valve assembly 12*b* and valve assembly 12*c* utilizing connection member 84 (here, a tab) of lower housing 42*b* and a cooperating connection member (a slot, not shown) on upper housing 40*c* of valve assembly 12*c*.

Figure 12:
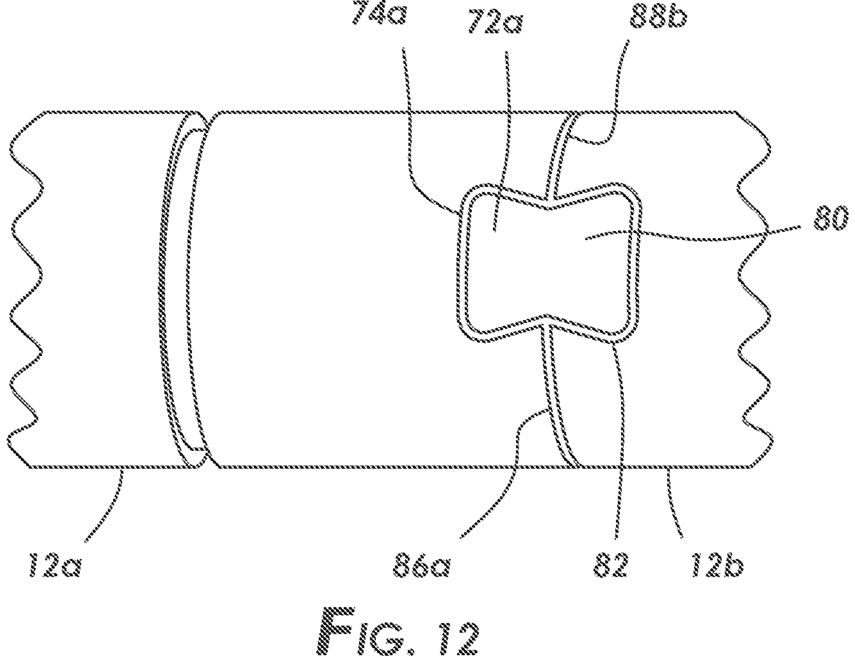
FIG. 12 is a schematic of an exemplary interlocking joint assembly between adjacent valve assemblies according to aspects of the disclosure.

In some embodiments, adjacent valve assemblies are rotationally and axially locked to one another. That is, the connection between adjacent valve assemblies is an interlocking joint as seen in the above embodiments with respect to the connection between upper and lower housings. FIG. 12 is a schematic of an exemplary interlocking joint assembly between adjacent valve assemblies according to aspects of the disclosure. In the figure, the interlocking joint between the upper and lower housings, 40*a* and 42*a*, respectively, includes the key 72*a* fitting into the keyway 74*a*, providing both axial and rotational locking, as explained above. In this embodiment, the connection between the valve assemblies 12*a* and 12*b* is also an interlocking joint providing rotational and axial locking. The connection includes a connection member 80 of the lower housing 42*b* which cooperates with connection member 82 of the upper housing 40*b* of valve assembly 12*b*. The connection members are seen as a key 80 and keyway 82, with the key in the exemplary shape of a trapezoid, thereby providing both rotational and axial locking between the valve assemblies. Stated another way, in this embodiment, the tab and slot, which provide only rotational locking, are replaced with a key and keyway, providing both rotational and axial locking. It can also be understood as replacing the rotationally locking junction between valve assemblies with an interlocking joint. The rotationally locking junctions between any and/or all of the valve assemblies can be substituted with rotationally and axially locking joints.

Figure 9:
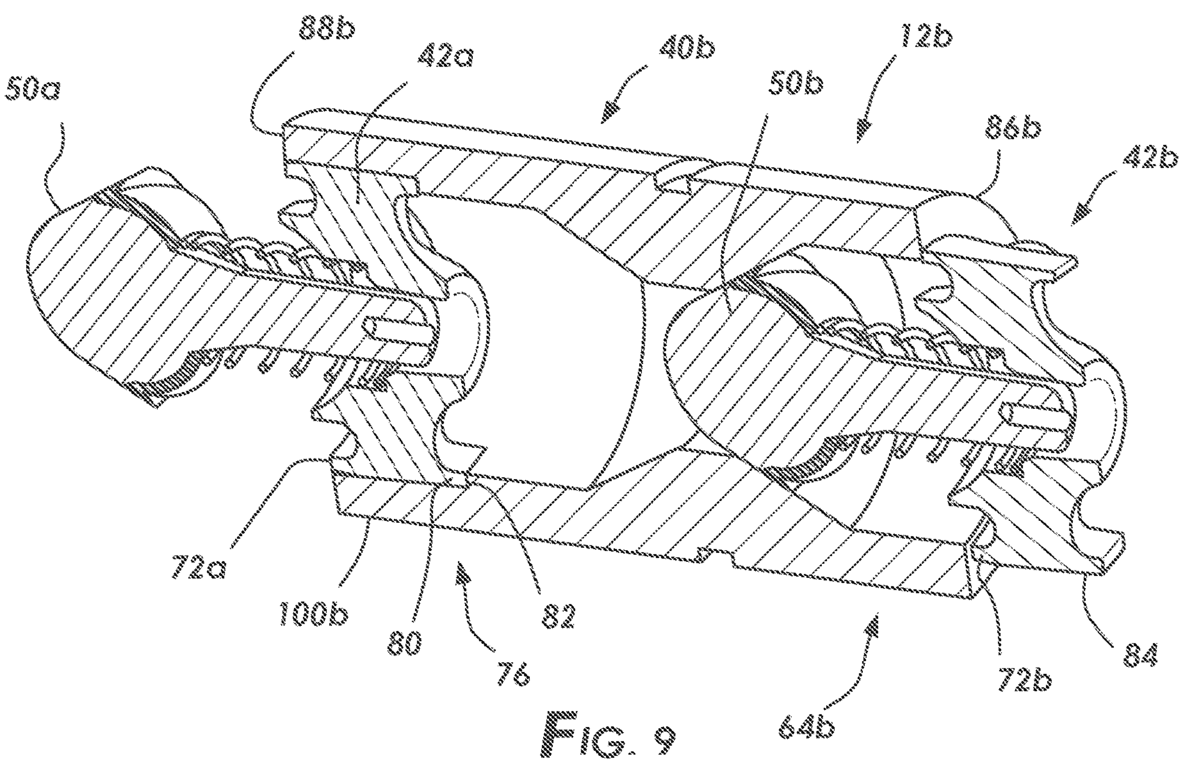
FIG. 9 is cross-sectional orthogonal view of an exemplary valve assembly and additional components from an adjacent valve assembly, having plungers in closed positions, according to aspects of the disclosure.
Figure 10:
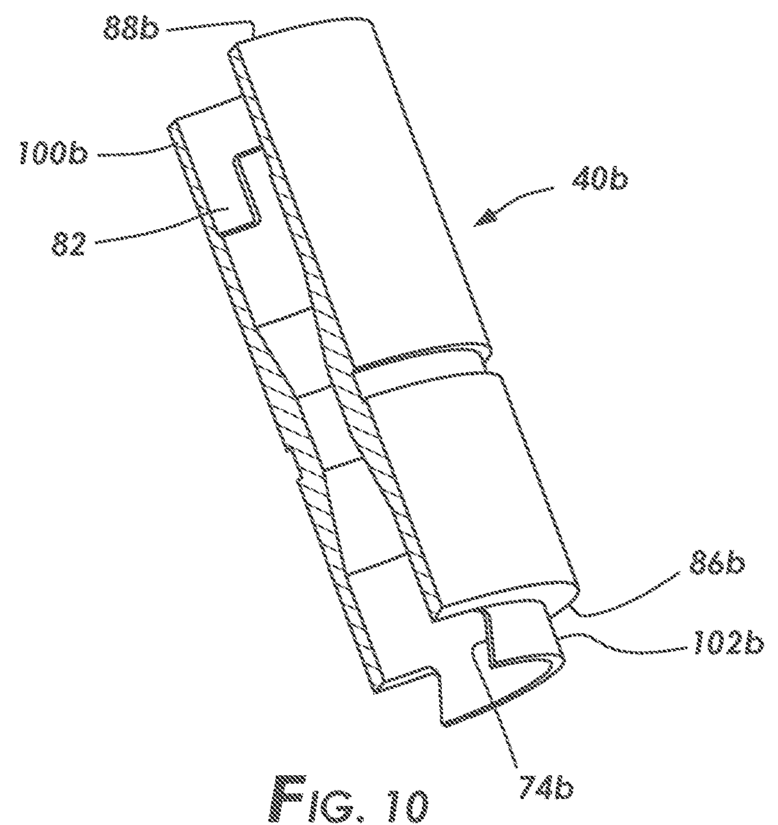
FIG. 10 is cross-sectional view of an exemplary upper housing of a valve assembly according to aspects of the disclosure.
Figure 11:
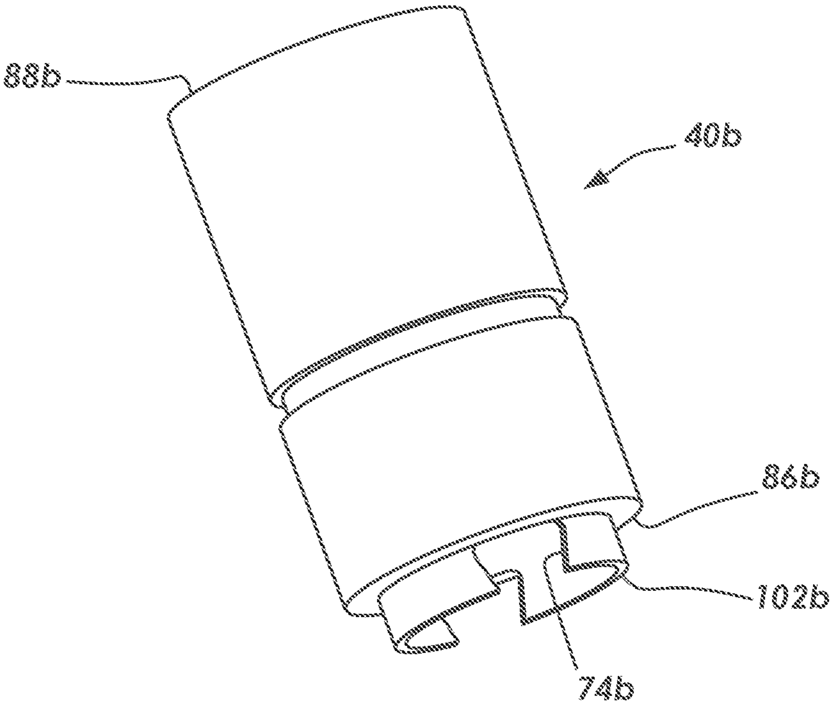
FIG. 11 is an orthogonal view of an exemplary upper housing of a valve assembly according to aspects of the disclosure.

FIGS. 8-11 are views of exemplary valve assemblies and parts thereof for explaining certain embodiments of the disclosure and are discussed together, with like parts bearing like numbers. FIG. 8 is a cross-sectional schematic of multiple exemplary modular valve assemblies configured in a tubular according to aspects of the disclosure. FIG. 9 is cross-sectional orthogonal view of an exemplary valve assembly and additional valve components, having two plungers seen in closed positions, according to aspects of the disclosure. FIG. 10 is cross-sectional view of an exemplary upper housing of a valve assembly. FIG. 11 is an orthogonal view of an exemplary upper housing of the valve assembly according to aspects of the disclosure. The embodiment of the disclosure seen in FIGS. 8-11 is similar in most respects with the embodiments described above. Consequently, the Figures will not be described in detail to avoid repetition. An understanding of the FIGS. 8-11 will necessarily include an understanding of the descriptions of the embodiments at FIGS. 1-7.

The modular valve assembly system is applicable in different sized tubulars for different wellbore sizes. For a larger size application, obviously, the valve members could simply be sized up. However, in an embodiment of the disclosure, the same size inner housing can be used as part of a valve assembly for a larger tubular, with the upper housing having a larger outer diameter than the inner housing. The system allows for manufacture of fewer sizes of inner housings and valve components, saving money and increasing efficiency.

FIG. 8 shows four valve assemblies 12*a-d* positioned in a tubular 14. A threaded nut 32 and insert 27 maintain the valve assemblies in the tubular. The valve assemblies **12*a-d* are similar to those discussed above. In short, each valve assembly includes an upper housing 40 and lower housing 42 connected together at an interlocking joint 64. The interlocking joint 64 comprises cooperating locking components 72 and 74. The valve components control fluid flow through a throughbore 44 with a reciprocating plunger 50 which is biased by a biasing mechanism 56 towards a closed position in which the plunger seats against a valve seat 48. The plunger is movable between the closed position and an open position, wherein the plunger impinges on a retaining surface 70. The lower housing 42 retains the plunger in the valve assembly, with a plunger stem 58 reciprocating in a stem bore 61 defined on the lower housing 42**.

Adjacent valve assemblies 12 are connected at a rotationally locking junction, such as junction 76 between assemblies **12*a* and 12*b*, junction 78 between assemblies 12*b* and 12*c*, and junction 79 between assemblies 12*c* and 12*d*. The junction 76 defines cooperating connection members 80 and 82; junction 78 defines cooperating members 84 and 85; junction 79 defines cooperating members 90 and 92**. The cooperating members in some embodiments are tabs and cooperating slots.

Since in this embodiment the lower housing 42 has a smaller outer diameter than the upper housing 40, the interlocking joint 64 is slightly altered as well. The interlocking joint **64*b* still rotationally and axially locks the upper and lower housings to one another. The upper housing 40*a* and lower housing 42*a* are connected at an interlocking joint 64*a*, which rotationally and axially locks the housings together. However, unlike in the embodiment at FIGS. 1-7, the lower housing 42*a* fits inside a cooperating sleeve 100*b* defined on the upper housing 40*b* of the adjacent valve assembly 12*b*. Similarly, the lower housing 42*b* fits inside a cooperating sleeve 100*c* defined on the upper housing 40*c* of the adjacent valve assembly 12*c*; and the lower housing 42*c* fits inside a cooperating sleeve 100*d* defined on the upper housing 40*d* of the adjacent valve assembly 12*d***.

The interlocking joint 64 now defines a cooperating keyway 74 on a generally circumferential flange 102 formed at the lower end of the upper housing 40. The flange 102, in an embodiment, has an outer diameter equal to that of the lower housing. The lower housing 42 still has a key 72 which fits into the keyway 74. Once fitted in position, the lower housing is locked axially and rotationally to the upper housing. It is understood that the additional features of sleeve and flange can be used alternately on the embodiment described at FIGS. 1-7.

The uppermost valve assembly **12*a* can be modified to cooperate with other tool components. For example, the upper valve assembly 12*a* has a shortened upper housing 40*a* (e.g., lacking some of its length and sleeve) and cooperates with the threaded nut 32. Similarly, the lowermost valve assembly 12*d* can be modified to cooperate with other tool components. In FIG. 8, the lowermost valve assembly 12*d* is unmodified, but cooperates with a clutch 110 having a profile similar to that of an upper housing 40**.

The embodiments disclosed above are illustrative only, as the present disclosure may be modified and practiced in different but equivalent manners apparent to those skilled in the art having the benefit of the teachings herein. It is therefore evident that the particular illustrative embodiments disclosed above may be altered or modified and all such variations are considered within the scope of the present disclosure. The various elements or steps according to the disclosed elements or steps can be combined advantageously or practiced together in various combinations or sub-combinations of elements or sequences of steps to increase the efficiency and benefits that can be obtained from the disclosure. It will be appreciated that one or more of the above embodiments may be combined with one or more of the other embodiments, unless explicitly stated otherwise. Furthermore, no limitations are intended to the details of construction, composition, design, or steps herein shown, other than as described in the claims. Section headings are for reference only and are non-limiting.

It is claimed:

1. A modular system of valve assemblies, the system comprising:

at least a first valve assembly attached to a second valve assembly, each valve assembly comprising:

an upper housing and a lower housing attached to one another at a non-threaded interlocking joint, the attached upper and lower housings defining a longitudinal throughbore;

the upper housing having a valve seat formed therein;

a plunger biased into contact with the valve seat, the plunger movable between a closed position wherein the plunger is in contact with the valve seat, and an open position wherein the plunger is spaced apart from the valve seat;

the lower housing retaining the plunger in the throughbore; and the interlocking joint rotationally locking the upper and lower housings to one another against relative rotation in any direction and axially locking the upper and lower housings to one another.

2. The modular system of claim 1, wherein the interlocking joint comprises:

at least a cooperating key and keyway defined on the upper and lower housings.

3. The modular system of claim 2, wherein the key is generally trapezoidal plate which fits into a generally trapezoidal keyway.

4. The modular system of claim 2, wherein the first and second valve assemblies are connected to one another along a rotationally locking junction comprising a cooperating tab and slot; and wherein the cooperating tab is attached to the key.

5. The modular system of claim 2, the lower housing having an outer diameter of less than the outer diameter of the upper housing, and wherein the interlocking joint further comprises a generally circumferential flange extending from the lower end of the upper housing, and wherein the keyway is defined on the flange.

6. The modular systems of claim 1, wherein the first and second valve assemblies are connected to one another along a first non-threaded rotationally locking junction which rotationally locks the first and second valve assemblies to one another against relative rotation in any direction.

7. The modular system of claim 6, wherein the rotationally locking junction comprises a tab defined on the lower housing of the first valve assembly and a slot defined on the upper housing of the second valve assembly.

8. The modular system of claim 6, wherein the rotationally locking junction further comprises a sleeve for surrounding the lower housing of the first valve assembly.

9. The modular system of claim 1, wherein the first and second valve assemblies are connected to one another along a non-threaded rotationally and axially locking junction.

10. The modular system of claim 1, wherein the lower housing of the second valve assembly defines a first connection member for cooperating with a corresponding second connection member of a third valve assembly.

11. The modular system of claim 10, wherein the second and third valve assemblies are connected to one another along a rotationally and axially locking junction.

12. The modular system of claim 1, further comprising a third valve assembly, wherein the second and third valve assemblies are connected to one another along a second non-threaded rotationally locking junction which rotationally locks the second and third valve assemblies to one another against relative rotation in any direction.

13. A method of controlling fluid flow through a tubular positioned in a subterranean wellbore comprising:

running a workstring into a wellbore, the workstring having a modular valve assembly positioned therein;

the modular valve assembly having a first valve assembly attached to a second valve assembly, each valve assembly comprising:

an upper housing and a lower housing attached to one another at a non-threaded interlocking joint, the attached upper and lower housings defining a longitudinal throughbore;

the upper housing having a valve seat formed therein;

a plunger biased into contact with the valve seat, the plunger movable between a closed position wherein the plunger is in contact with the valve seat, and an open position wherein the plunger is spaced apart from the valve seat;

the lower housing retaining the plunger in the throughbore; and the interlocking joint rotationally locking the upper and lower housings to one another against relative rotation in any direction and axially locking the upper and lower housings to one another;

flowing a fluid through the first and second valve assemblies, fluid pressure moving the plungers from closed positions to open positions to allow fluid flow through the valve assemblies; and moving the plungers from open positions to closed positions in response to a decrease in fluid pressure.

14. The method of claim 13, wherein the interlocking joint comprises: at least a cooperating key and keyway defined on the upper and lower housings.

15. The method of claim 13, wherein the first and second valve assemblies are connected to one another along a non-threaded rotationally locking junction which rotationally locks the first and second valve assemblies to one another against relative rotation in any direction.

16. The method of claim 13, wherein the first and second connection members comprise a cooperating tab and slot, and wherein the cooperating tab is attached to the key.

17. The method of claim 13, wherein the first and second valve assemblies are connected to one another along a non-threaded rotationally and axially locking junction which rotationally and axially locks the first and second valve assemblies to one another.

18. The method of claim 16, wherein the interlocking joint further comprises a generally circumferential flange extending from the lower end of the upper housing, and wherein the rotationally locking junction further comprises a sleeve for surrounding the lower housing of the first valve assembly.

19. The method of claim 13, further comprising a third valve assembly, wherein the second and third valve assemblies are connected to one another along a non-threaded rotationally locking junction which rotationally locks the second and third valve assemblies to one another against relative rotation in any direction.

* * * * *